US010136724B2

(12) United States Patent
Smed

(10) Patent No.: US 10,136,724 B2
(45) Date of Patent: Nov. 27, 2018

(54) BRACKET FOR MOUNTING ADJUSTABLE-HEIGHT LEG

(71) Applicant: Ole Falk Smed, Calgary (CA)

(72) Inventor: Ole Falk Smed, Calgary (CA)

( * ) Notice: Subject to any disclaimer, the term of this patent is extended or adjusted under 35 U.S.C. 154(b) by 0 days.

(21) Appl. No.: 15/427,397

(22) Filed: Feb. 8, 2017

(65) Prior Publication Data

US 2018/0220788 A1  Aug. 9, 2018

(51) Int. Cl.
*A47B 21/00* (2006.01)
*A47B 21/02* (2006.01)
*A47B 9/20* (2006.01)
*A47B 96/04* (2006.01)

(52) U.S. Cl.
CPC .............. *A47B 21/02* (2013.01); *A47B 9/20* (2013.01); *A47B 96/04* (2013.01)

(58) Field of Classification Search
CPC ............ A47B 21/02; A47B 9/20; A47B 96/04
USPC ...................... 108/42, 48, 50.01, 50.02, 147; 248/220.21, 224.8, 200
See application file for complete search history.

(56) References Cited

U.S. PATENT DOCUMENTS

| | | | | |
|---|---|---|---|---|
| 4,133,507 A * | 1/1979 | Chervenak | ........... | A47B 95/008 248/223.41 |
| 4,700,916 A * | 10/1987 | Bastian | .................. | A47B 57/42 211/192 |
| 4,762,072 A * | 8/1988 | Boundy | ................. | A47B 21/06 108/50.02 |
| 4,987,835 A * | 1/1991 | Schwartz | ............... | A47B 57/30 108/147 |
| 5,230,492 A * | 7/1993 | Zwart | .................... | A47B 57/42 211/187 |
| 5,373,793 A * | 12/1994 | Crossman | ................ | A47B 9/04 108/42 |
| 5,392,934 A * | 2/1995 | Fox | ....................... | A47B 95/008 211/103 |
| 5,428,928 A * | 7/1995 | Hellwig | ................. | A47B 21/06 108/147 |
| 5,931,429 A * | 8/1999 | Hellwig | ................... | A47B 5/06 108/108 |
| 6,076,317 A * | 6/2000 | Hellwig | ............... | E04B 2/7425 52/220.7 |
| 7,861,986 B2 * | 1/2011 | Cline | .................... | E04B 2/7416 211/94.01 |
| 8,919,264 B1 * | 12/2014 | Lager | ....................... | A47B 9/04 108/108 |
| 2011/0289859 A1* | 12/2011 | Picchio | ................ | A47B 83/001 52/36.4 |

* cited by examiner

*Primary Examiner* — Janet M Wilkens
(74) *Attorney, Agent, or Firm* — Carl A. Hjort, III

(57) ABSTRACT

An assembly is disclosed having a panel forming part of a modular wall for dividing workspaces in an office, the panel having at least two channels formed therein; a desk surface; an adjustable-height leg, having an outer shell, a top casting for engagement with the desk surface and an actuator disposed within the outer shell for adjusting the height of the leg; and first and second brackets, said first bracket engaged with an upper end of the outer shell of the adjustable height leg and one of the channels formed in the panel and said second bracket engaged with a lower end of the outer shell of the adjustable height leg and the other channel formed in the panel and wherein the adjustable-height leg is supported by the first and second brackets and does not contact a floor surface underlying the panel.

1 Claim, 4 Drawing Sheets

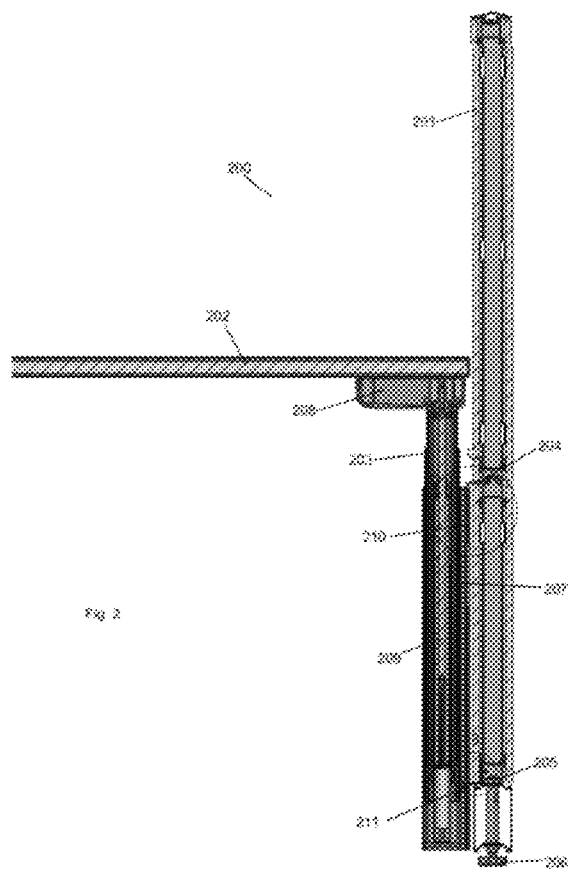

BRACKET FOR MOUNTING ADJUSTABLE-HEIGHT LEG

BRIEF DESCRIPTION OF THE DRAWINGS

FIG. 2 is an assembled view of an adjustable-height leg mounted to a desk surface and panel.

DETAILED DESCRIPTION OF THE DRAWINGS

Figure 1A:
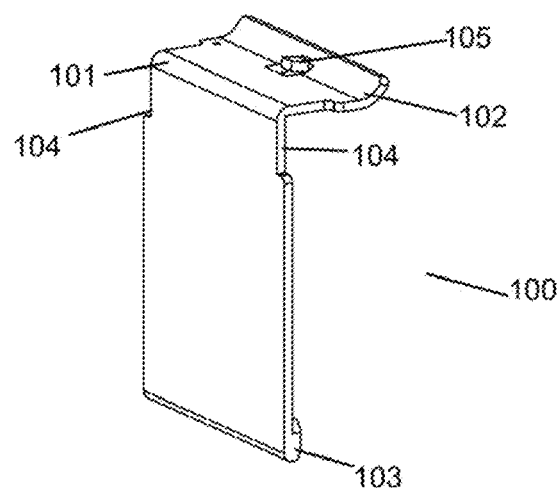
FIGS. 1a and 1b are perspective views of embodiments of the first and second brackets for mounting an adjustable-height leg.
Figure 1B:
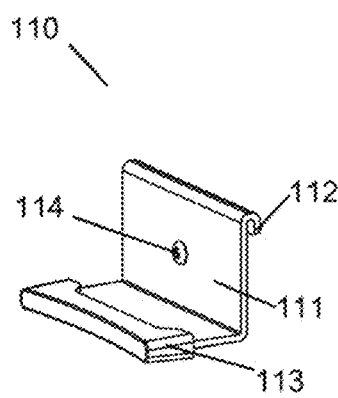

FIGS. 1a and 1b are perspective views of embodiments of the first and second brackets for mounting an adjustable-height leg. FIG. 1a shows the first mounting bracket and FIG. 1b shows the second mounting bracket. As can be seen in FIG. 1a, the first mounting bracket 100 has a generally L-shaped body 101 with an up-turned lip 102 and one end thereof and a rib 103 at the opposite end thereof. The rib 103 engages with a mating surface on the outer shell of an adjustable-height leg (discussed in more detail below) to retain the first mounting bracket 100 in connection with the adjustable-height leg. Also visible in the first mounting bracket 100 are cut-outs 104 on each edge of the bracket in the area where the bracket bends approximately 90°. These cut-outs 104 assist in the alignment of bracket 100 in the slot (identified below as 301) during the assembly of the leg to the panel. Also visible in FIG. 1a is the hole with a key 105 located near the up-turned lip 102. The hole with key 105 helps retain the upturned lip 102 in the channel it mates with in the panel as will be discussed in greater detail below.

The second mounting bracket is shown in FIG. 1b. As can be seen in FIG. 1b, the second mounting bracket 110 has a generally L-shaped body 111 with a curved end 112 at one end thereof and a bumper 113 disposed at the opposite end thereof. The curved end 112 is adapted to engage with a channel in a panel (as described in greater detail below) while the bumper 113 fits into a slot in the outer shell of an adjustable-height leg (discussed in more detail below) to retain the second mounting bracket 110 in connection with the adjustable-height leg. A screw 114 may be provided through second mounting bracket 110 to allow the mounting bracket to be screwed to the panel to increase the stability of the connection of mounting bracket 110 to the panel.

FIG. 2 is an assembled view of an adjustable-height leg mounted to a desk surface and panel. As can be seen in FIG. 2, the assembly 200 comprises a panel 201, a desk surface 202, and an adjustable-height leg 203. The panel 201 forms part of a modular wall for dividing workspaces in an office. The panel 201 has at least two channels formed therein. These channels are identified as 204 and 205 in FIG. 2 and will be discussed in greater detail in connection with the enlarged views of FIGS. 3 and 4. The panel 201 has a foot 206 that rests on a floor surface (not shown) underlying the panel 201. The panel 201 may be provided with sound insulation and a fabric covering that is aesthetically pleasing to a user.

Also shown in the assembly 200 of FIG. 2 is the adjustable-height leg 203. Adjustable-height leg 203 has an outer shell 207, a top casting 208 disposed at the top of the outer shell 207 and an actuator 209 disposed inside the outer shell 207. It should be appreciated that the height-adjustable leg 203 can be made taller or shorter by operation of the actuator 209. Thus, a user can select a height for the height-adjustable leg 203 and the actuator will increase or decrease the height of the leg to meet the user's criteria. Outer shell 207 has a telescoping configuration, such that as the height of the height-adjustable leg increases, the outer shell 207 telescopically increases in height to cover the interior components of the height-adjustable leg 203. The outer shell 207 is also provided with mounting feature 210 and slot 211 for receiving the first and second mounting brackets, 100 and 110 respectively. The mating of the mounting brackets to the outer shell will be discussed in greater detail in connection with the discussion of the enlarged views of FIGS. 3 and 4.

As can be seen in FIG. 2, the adjustable-height leg 203 is supported by the first and second brackets 100 and 110 and does not contact a floor surface (not shown) underlying the panel 201. A desk surface 202 is also provided in the assembly 200. Desk surface 202 is joined to the height-adjustable leg 203 by the top casting 208. The desk surface 202 may be made from any suitable material, e.g. wood, MDF board, or other composite materials.

Figure 3:
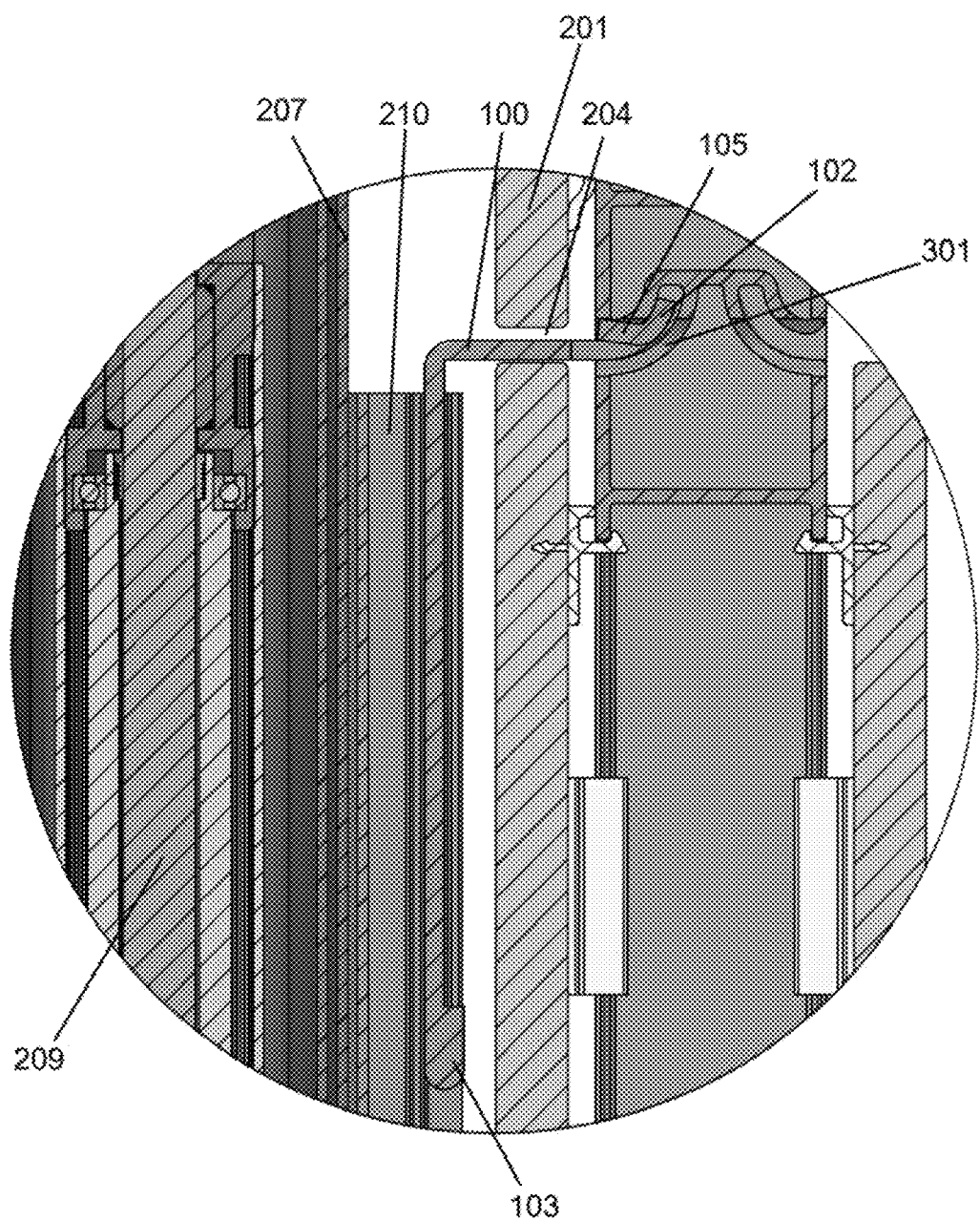
FIG. 3 is an enlarged view of the area denoted as "C" in FIG. 2.

FIG. 3 is an enlarged view of the area denoted as "C" in FIG. 2. Like numerals will be used to identify elements which have already been discussed. Thus, in FIG. 3, the outer shell 207 with mounting feature 210 is visible. Also visible is the actuator 209, panel 201 with channel 204. Engaged with the mounting feature 210 is the first mounting bracket 100. When the first mounting bracket 100 is seated in the mounting feature 210, the rib 103 on first mounting bracket 100 makes contact with the bottom edge of mounting feature 210, thereby retaining first mounting bracket 100 in connection with the mounting feature 210. As can be further seen in FIG. 3, opposite end of first mounting bracket 100, i.e. the end with the upturned lip 102, passes through the channel 204 in panel 201 and engaged with curved slot 301. The key 105 helps to retain the upturned lip 102 in curved slot 301. As can be seen in FIG. 3, a second curved slot (not numbered) is provided opposite the first curved slot 301, so that a similar arrangement of mounting brackets can be provided on the opposite side of the panel, if required by the user's workspace plan.

Figure 4:
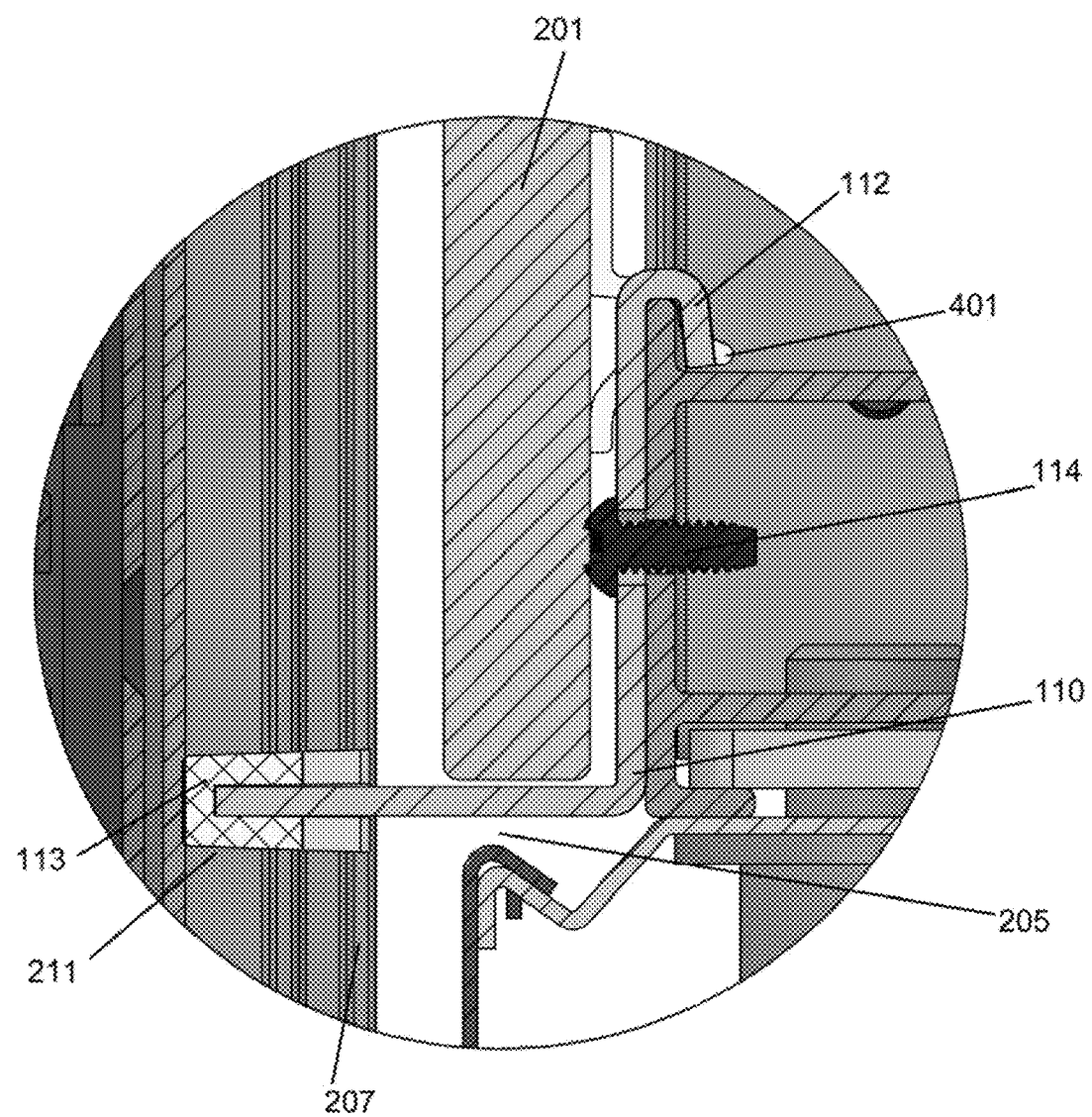
FIG. 4 is an enlarged view of the area denoted as "B" in FIG. 2.

FIG. 4 is an enlarged view of the area denoted as "B" in FIG. 2. Like numerals will be used to identify elements which have already been discussed. Thus, in FIG. 4, the outer shell 207 with slot 211 is visible. Also visible is panel 201 with channel 205 and the second mounting bracket 110 with a curved end 112 at one end thereof and a bumper 113 disposed at the opposite end thereof. The curved end 112 is adapted to engage with a curved slot 401 while the bumper 113 fits into a slot 211 in the outer shell 207 of an adjustable-height leg 203 to retain the second mounting bracket 110 in connection with the adjustable-height leg 203. A screw 114 may be provided through second mounting bracket 110 to allow the mounting bracket to be screwed to the panel 201's interior components to increase the stability of the connection of mounting bracket 110 to the panel 201.

It will be appreciated by those of ordinary skill in the art that, while the forgoing disclosure has been set forth in connection with particular embodiments and examples, the disclosure is not intended to be necessarily so limited, and that numerous other embodiments, examples, uses, modifications and departures from the embodiments, examples and uses described herein are intended to be encompassed by the claims attached hereto. Various features of the disclosure are set forth in the following claims.

I claim:

1. An assembly comprising:

a panel forming part of a modular wall for dividing workspaces in an office, said panel having first and second horizontal channels formed therein;

a desk surface;

an adjustable-height leg, said adjustable height leg having an outer shell, a top casting for engagement with the desk surface and an actuator disposed within the outer shell for adjusting the height of the leg; and first and second brackets, said first bracket having a generally L-shaped body, a lip with hole for engagement in the first horizontal channel and a rib for engagement with an upper end of the outer shell of the adjustable height leg and said second bracket having a generally L-shaped body with a curved end for engagement with in the second horizontal channel and a bumper for engagement in a slot at a lower end of the outer shell of the adjustable height leg and wherein the adjustable-height leg is supported by the first and second brackets and does not contact a floor surface underlying the panel.

\* \* \* \* \*